US011905840B2

(12) United States Patent
Krzywon

(10) Patent No.: US 11,905,840 B2
(45) Date of Patent: Feb. 20, 2024

(54) SYSTEM AND METHOD FOR DETECTING FAILURE OF A PROPELLER FEEDBACK DEVICE

(71) Applicant: PRATT & WHITNEY CANADA CORP., Longueuil (CA)

(72) Inventor: Jagoda Krzywon, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 327 days.

(21) Appl. No.: 17/163,881

(22) Filed: Feb. 1, 2021

(65) Prior Publication Data
US 2022/0243608 A1 Aug. 4, 2022

(51) Int. Cl.
*F01D 21/00* (2006.01)
*B64C 11/38* (2006.01)
(Continued)

(52) U.S. Cl.
CPC .......... *F01D 21/003* (2013.01); *B64C 11/385* (2013.01); *B64C 11/40* (2013.01);
(Continued)

(58) Field of Classification Search
CPC ..... B64C 11/301; B64C 11/38; B64C 11/385; B64C 11/40; F01D 21/003; F01D 21/14; F01D 7/02; B64D 2045/0085; F05D 2220/323; F05D 2260/80; F05D 2270/02; F05D 2270/09; F05D 2270/304; F05D 2270/807
See application file for complete search history.

(56) References Cited

U.S. PATENT DOCUMENTS 4,711,615 A * 12/1987 Rusu ....................... B64C 11/40
416/154
5,779,446 A * 7/1998 Althof ...................... F01D 7/00
416/49

(Continued)

FOREIGN PATENT DOCUMENTS

EP 3284666 2/2018

OTHER PUBLICATIONS

Anonymous, "Propeller Operation and Malfunctions Basic Familiarization for Flight Crews Introduction".

*Primary Examiner* — Eldon T Brockman
*Assistant Examiner* — Andrew J Marien
(74) *Attorney, Agent, or Firm* — NORTON ROSE FULBRIGHT CANADA LLP

(57) ABSTRACT

A sensor signal produced by a sensor as a feedback device rotates with a propeller about an axis and moves along the axis with adjustment of a blade angle of the propeller is received, the sensor signal indicative of a rotational speed and of the blade angle of the propeller. From the sensor signal, it is determined whether the rotational speed is within a predetermined range of a reference speed and an expected change in the blade angle has occurred in response to a command to adjust the blade angle to maintain the rotational speed at the reference speed. In response to determining that the rotational speed is within the predetermined range of the reference speed and the expected change in the blade angle has failed to occur in response to the command, inoperable movement of the feedback device along the axis is determined and an alert is output.

18 Claims, 8 Drawing Sheets

(51) Int. Cl.
  *B64C 11/40*  (2006.01)
  *F01D 7/02*  (2006.01)
  *F01D 21/14*  (2006.01)
  *B64D 45/00*  (2006.01)

(52) U.S. Cl.
  CPC ............... *F01D 7/02* (2013.01); *F01D 21/14* (2013.01); *B64D 2045/0085* (2013.01); *F05D 2220/323* (2013.01); *F05D 2260/80* (2013.01); *F05D 2270/02* (2013.01); *F05D 2270/09* (2013.01); *F05D 2270/304* (2013.01); *F05D 2270/807* (2013.01)

(56) References Cited

U.S. PATENT DOCUMENTS

| | | | | |
|---|---|---|---|---|
| 5,897,293 | A * | 4/1999 | Arel ...................... | B64C 11/303 |
| | | | | 416/49 |
| 5,997,250 | A * | 12/1999 | Carter, Jr. ............... | B64C 11/40 |
| | | | | 416/37 |
| 10,487,682 | B2 * | 11/2019 | Duke .................... | B64C 11/325 |
| 11,143,200 | B2 * | 10/2021 | Albrecht ................ | F15B 19/005 |
| 2012/0296500 | A1 * | 11/2012 | Yamasaki ............... | B64C 13/00 |
| | | | | 701/14 |
| 2016/0083076 | A1 * | 3/2016 | White .................... | B64C 11/34 |
| | | | | 244/17.13 |
| 2017/0248085 | A1 * | 8/2017 | Carrington .............. | F02B 61/04 |
| 2019/0127076 | A1 * | 5/2019 | Hodges .................. | B64D 31/10 |
| 2020/0010219 | A1 * | 1/2020 | Felippone ................ | F02C 9/58 |
| 2020/0298959 | A1 * | 9/2020 | Castellani ............... | F01D 5/021 |
| 2021/0009278 | A1 * | 1/2021 | Forte ..................... | B64D 31/06 |

* cited by examiner

SYSTEM AND METHOD FOR DETECTING FAILURE OF A PROPELLER FEEDBACK DEVICE

TECHNICAL FIELD

The application relates generally to engines, and, more particularly, to failure detection for a feedback device of a propeller driven by an engine.

BACKGROUND OF THE ART

Constant speed propellers are controlled by varying blade angles to maintain the speed of the propeller at a reference speed. In order to do so, the propeller blade angle is increased with increasing engine power and speed and decreased with decreasing engine power and speed. Varying the blade angle is achieved by either adding or removing oil in the propeller dome. In order to accurately measure the propeller blade angle, some propeller feedback systems use a feedback device, sometimes referred to as a beta ring, which moves axially and rotates with the propeller. Any malfunction of the feedback device, and particularly the feedback device being unable to provide a reading of the propeller blade angle, could however result in the propeller being inadvertently directed towards a reverse range of blade angles, which would in turn create a risk to aircraft safety. There is therefore a need for systems and methods for detecting failure of feedback devices used in propeller feedback systems.

SUMMARY

In one aspect, there is provided a method for detecting failure of a feedback device operatively coupled to a propeller driven by an engine. The method comprises, at a computing device, receiving at least one sensor signal from at least one sensor, the at least one sensor signal produced by the at least one sensor as the feedback device rotates with the propeller about an axis and moves along the axis with adjustment of a blade angle of the propeller, the at least one sensor signal indicative of a rotational speed and of the blade angle of the propeller, determining, from the at least one sensor signal, whether the rotational speed of the propeller is within a predetermined range of a reference speed and an expected change in the blade angle of the propeller has occurred in response to a command to adjust the blade angle of the propeller to maintain the rotational speed of the propeller at the reference speed, and in response to determining, from the at least one sensor signal, that the rotational speed of the propeller is within the predetermined range of the reference speed and the expected change in the blade angle of the propeller has failed to occur in response to the command, determining that movement of the feedback device along the axis is inoperable and outputting an alert.

In another aspect, there is provided a system for detecting failure of a feedback device operatively coupled to a propeller driven by an engine. The system comprises a processing unit and a non-transitory computer readable medium having stored thereon program code executable by the processing unit for receiving at least one sensor signal from at least one sensor, the at least one sensor signal produced by the at least one sensor as the feedback device rotates with the propeller about an axis and moves along the axis with adjustment of a blade angle of the propeller, the at least one sensor signal indicative of a rotational speed and of the blade angle of the propeller, determining, from the at least one sensor signal, whether the rotational speed of the propeller is within a predetermined range of a reference speed and an expected change in the blade angle of the propeller has occurred in response to a command to adjust the blade angle of the propeller to maintain the rotational speed of the propeller at the reference speed, and in response to determining, from the at least one sensor signal, that the rotational speed of the propeller is within the predetermined range of the reference speed and the expected change in the blade angle of the propeller has failed to occur in response to the command, determining that movement of the feedback device along the axis is inoperable and outputting an alert.

In a further aspect, there is provided a non-transitory computer-readable medium having stored thereon program instructions executable by a processor for detecting failure of a feedback device operatively coupled to a propeller driven by an engine. The program instructions are configured for receiving at least one sensor signal from at least one sensor, the at least one sensor signal produced by the at least one sensor as the feedback device rotates with the propeller about an axis and moves along the axis with adjustment of a blade angle of the propeller, the at least one sensor signal indicative of a rotational speed and of the blade angle of the propeller, determining, from the at least one sensor signal, whether the rotational speed of the propeller is within a predetermined range of a reference speed and an expected change in the blade angle of the propeller has occurred in response to a command to adjust the blade angle of the propeller to maintain the rotational speed of the propeller at the reference speed, and in response to determining, from the at least one sensor signal, that the rotational speed of the propeller has been maintained at the reference speed and the expected change in the blade angle of the propeller has failed to occur in response to the command, determining that movement of the feedback device along the axis is inoperable and outputting an alert accordingly.

DESCRIPTION OF THE DRAWINGS

Reference is now made to the accompanying figures in which.

It will be noted that throughout the appended drawings, like features are identified by like reference numerals.

DETAILED DESCRIPTION

Figure 1A:
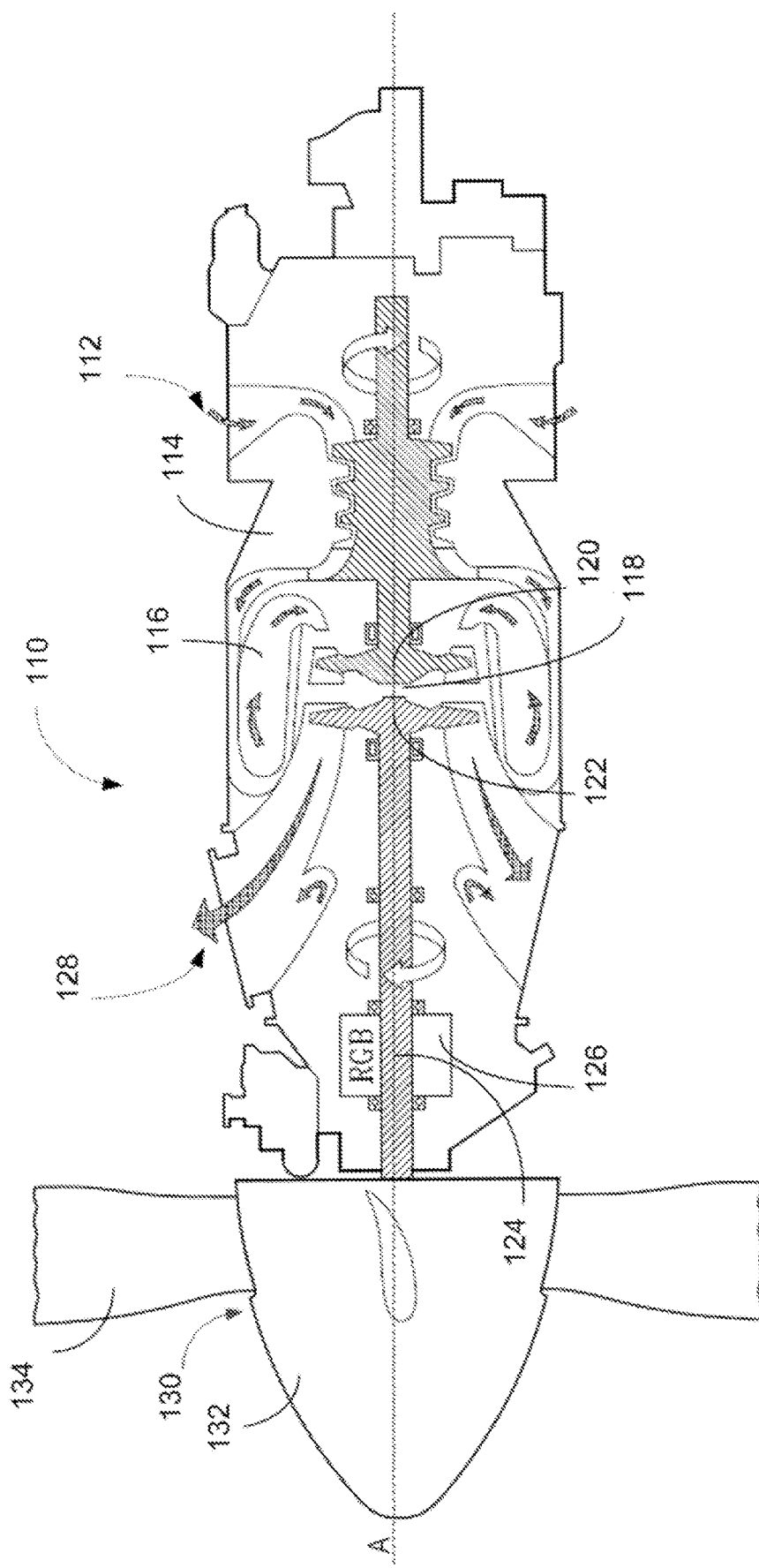
FIG. 1A is a schematic cross-sectional view of an engine, in accordance with an illustrative embodiment.

There is described herein systems and methods for detecting failure of a feedback device used in a propeller feedback system of an aircraft, and more specifically for detecting that axial movement of the feedback device is inoperable. The aircraft is equipped with at least one engine, such as the exemplary engine 110 depicted in FIG. 1A. In one embodiment, the engine 110 is a gas turbine engine of a type typically provided for use in subsonic flight. In this embodiment, the engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and is coupled with a reduction gearbox (RGB) 126. The power turbine 122 rotatingly drives a rotor shaft (also referred to herein as a propeller shaft or an output shaft) 124 about a propeller shaft axis 'A' through the RGB 126. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades 134 connected to the hub 132 by any suitable means and extending radially therefrom. The blades 134 are also each rotatable about their own radial axes (denoted by axis 'B' in FIG. 1B) through a plurality of adjustable blade angles. As used herein, the term "blade angle" (also referred to as the "pitch angle" or "pitch") refers to the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full (or maximum) reverse, and forward thrust. The blade angles can be changed to achieve a given mode of operation. Depending on the mode of operation, the blade angle may be positive or negative: the feather and forward thrust modes are associated with positive blade angles, and the full reverse mode is associated with negative blade angles.

The propeller 130 converts rotary motion from the engine 110 to provide propulsive force to the aircraft (also referred to herein as thrust). In one embodiment, the propeller 130 is a constant speed variable pitch propeller, meaning that the propeller 130 is designed to have its blade angle automatically changed to allow it to maintain a constant rotational speed (also referred to herein as a "reference speed"), regardless of the amount of engine torque being produced, the speed of the aircraft, or the altitude at which the aircraft is flying. Other configurations for a turboprop engine may also apply.

Although the examples illustrated herein show a turboprop engine, it will be understood that the methods and systems described herein may be applied to other propeller-based engines, such as piston engines, electrical engines, and the like. It should also be understood that the engine 110 may be any suitable aircraft propulsion system, and may include in some embodiments an all-electric propulsion system or a hybrid-electric propulsion system having a propeller driven in a hybrid architecture (series, parallel, or series/parallel) or turboelectric architecture (turboelectric or partial turboelectric). In addition, it will be understood that the engine 110 may be found in aircraft as well as in other industrial applications, including, but not limited to, wind power turbines and ship propulsion and gas or electric power generators.

Figure 1B:
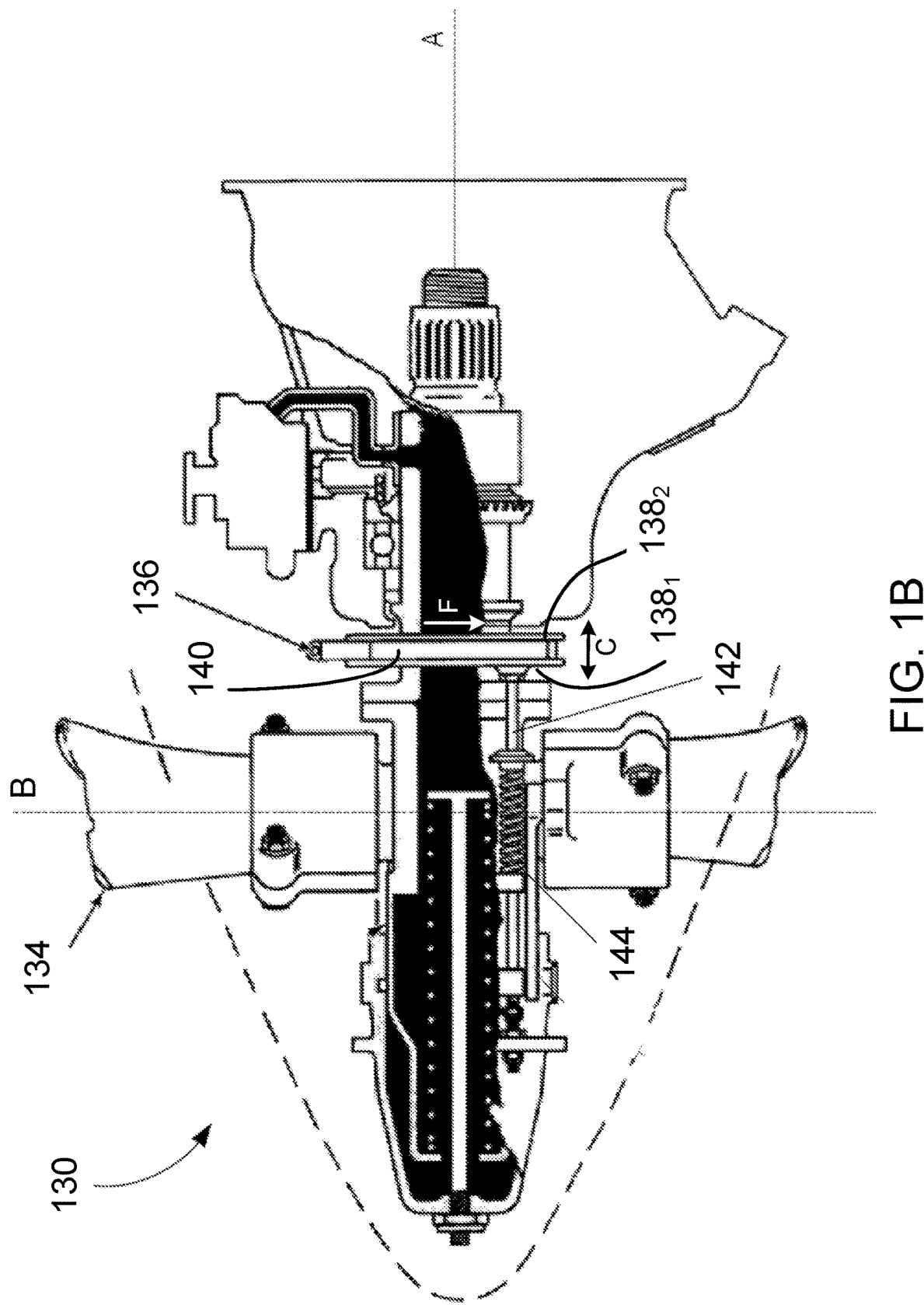
FIG. 1B is a schematic diagram of the propeller of FIG. 1A showing an example feedback device, in accordance with one embodiment.

Referring now to FIG. 1B in addition to FIG. 1A, a propeller feedback system (not shown) may be used for sensing a feedback device (also referred to as a feedback ring, beta ring, or phonic wheel) 136 of an aircraft propeller, such as the propeller 130. In some embodiments the feedback device 136 is embodied as a circular disk which rotates as part of the engine 110, for example with the propeller shaft 124 or with the propeller 130. The feedback device 136 comprises opposing faces (not shown) having outer edges $138_1$, $138_2$ and defines an exposed surface (also referred to as a "root surface") 140 which extends between the opposing faces is circumscribed by them. Put differently, the surface 140 of the feedback device 136 is the periphery of the circular disk which spans between the two opposing faces and the root surface 140 intersects the opposing faces at the edges $138_1$, $138_2$.

A plurality of circumferentially-spaced apart and detectable features (also referred to as readable "position markers", not shown) are provided on the surface 140 for detection by sensor(s) (not shown) positioned adjacent the surface 140. The d position markers may be spaced equiangularly about the perimeter (also referred to herein as the "circumference") of the feedback device 136. In some embodiments, the position markers may be disposed on (and the sensor(s) provided adjacent) a radially-outer side of the feedback device 136. Alternatively, the position markers could be disposed on (and the sensor(s) provided adjacent) a radially-inner side of feedback device 136. In other words, the surface on which the position markers are disposed (and adjacent to which the sensor(s) are provided) may either be a radially-outer side or a radially-inner side of the feedback device 136. The position markers may be manufactured separately from the feedback device 136 and attached thereto using any suitable technique, such as welding or the like. A position marker can then be a portion of the feedback device 136 which is made of a different material, or to which is applied a layer of a different material. The position markers may be applied to the surface 140, for instance as strips of metal or other material for detection by the sensor(s).

In one embodiment, the position markers may comprise a plurality of first markers (referred to herein as "straight" markers) arranged along a first direction, which is substantially transverse to the opposing edges $138_1$, $138_2$ (i.e. substantially parallel to rotation axis 'A'). In one embodiment, the first markers may be substantially equally spaced from one another on the surface 140. The first markers may be of substantially a common shape and size, for example having a common volumetric size. Still, other embodiments are considered. The position markers may also comprise at least one supplementary (or second) marker (referred to herein as an "angled" or "slanted" marker) which is positioned between two adjacent first (or straight) markers. Each second marker is illustratively oriented along a second direction, which is at an angle relative to the first direction along which the first markers are arranged. The angle between the first and second directions can be any suitable value between 1° and 89°, for example 30°, 45°, 60°, or any other value, as appropriate. In some embodiments, the feedback device 136 includes only a single second marker while, in other embodiments, the feedback device 136 can include more than one (e.g., two, three, four, or more) second marker. In embodiments in which the feedback device 136 includes more than one second marker, the second markers can all be oriented along a common orientation or can be oriented along one or more different orientations. A second marker can be located at substantially a midpoint between two adjacent first markers or can be located close to a particular one of two adjacent first markers. Other embodiments may apply.

In some embodiments, a single sensor is mounted in close proximity to the feedback device 136 and the position markers. In other embodiments, in order to provide redundancy as well as multiple signal sources at different axial locations, one or more additional sensors are provided. In one embodiment, the one or more sensors are fixedly mounted to a static portion of the engine 110. In other embodiments, the one or more sensors are mounted for rotation with propeller 130 and to move axially with adjustment of the blade angle of the blades 134 of the propeller 130, and the feedback device 136 is fixedly mounted to a static portion of the engine 110. For example, in one embodiment, one sensor is mounted to a flange of a housing of the RGB 126, so as to be positioned adjacent the plurality of position markers, which may extend away from the feedback device 136 and towards the sensor. The sensor may be mounted at any suitable angle relative to the position markers. The sensor(s) can then be used to measure the rotation of the feedback device 136 via the position markers, the rotational speed of the propeller 130, as well as a blade angle of the propeller 130.

In one embodiment, the feedback device 136 is mounted for rotation about the axis A (e.g., in the direction of arrow 'F') with propeller 130 and to move axially (i.e. in a longitudinal sliding movement) along the axis A (e.g., in the direction of arrow 'C') to a plurality of axial positions, with adjustment of the blade angle of the propeller 130. The feedback device 136 may be supported by support members, such as a series of circumferentially spaced feedback rods 142 that extend along the axis A and a compression spring 144 may surround an end portion of each rod 142. As will be discussed further below, the position markers provided on the feedback device 136 are then used for detecting the position of the feedback device 136 as the feedback device 136 and propeller 130 rotate about axis A and as the feedback device 136 is displaced longitudinally along axis A, the position of the feedback device 136 being in turn indicative (by way of correlation) of the rotational speed and of the blade angle of the propeller 130.

Figure 2:
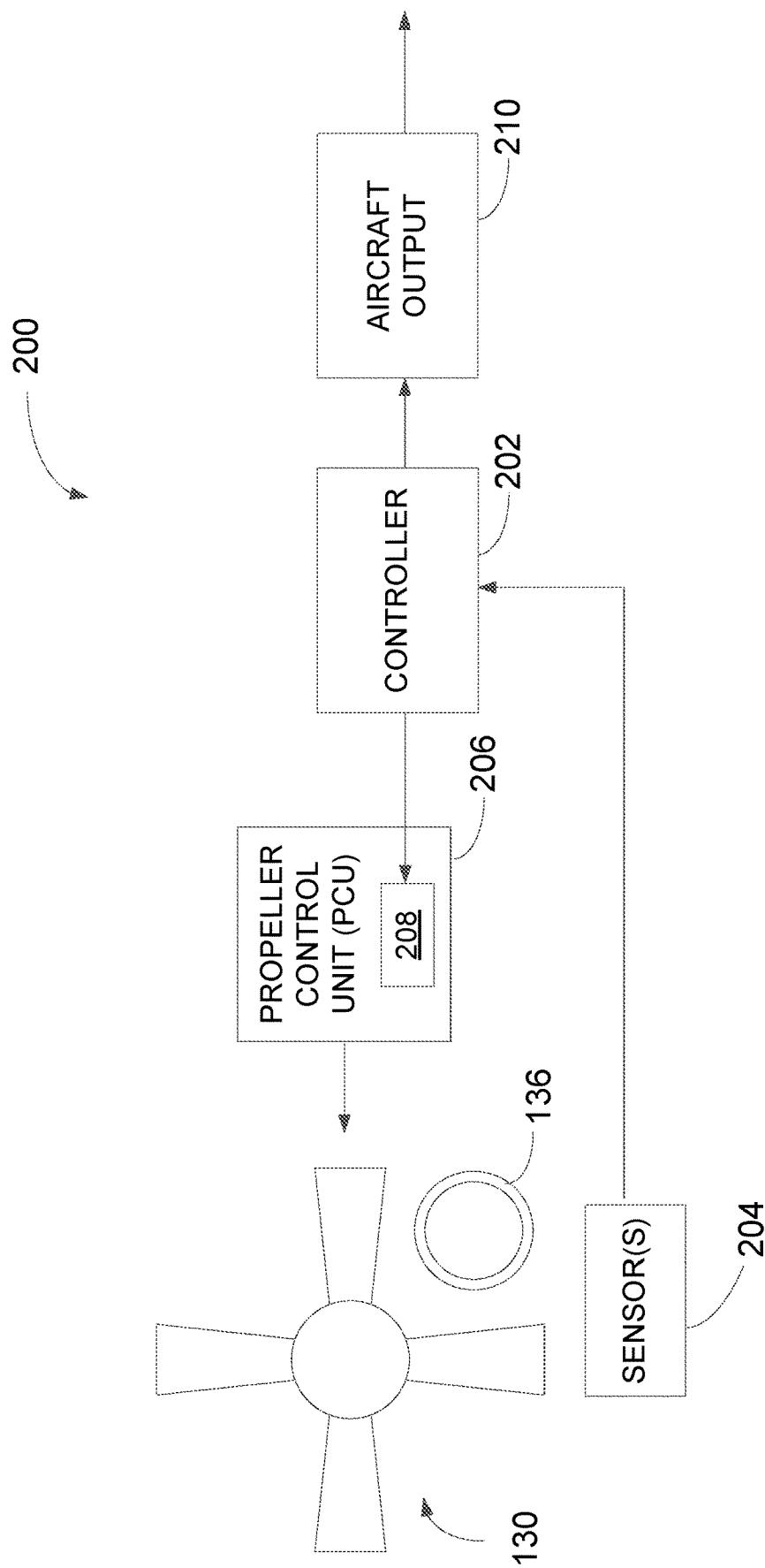
FIG. 2 is a schematic diagram of an example embodiment of a propeller control assembly for the engine of FIG. 1A, in accordance with an illustrative embodiment.

Referring now to FIG. 2 in addition to FIG. 1A and FIG. 1B, there is illustrated an example embodiment of a propeller control assembly 200. A controller 202 receives, from one or more sensors 204, one or more input signals (referred to herein as "sensor signal(s)"). In the embodiment illustrated in FIG. 2, the sensor(s) 204 are shown as being positioned adjacent (i.e. coupled to) the propeller 130 and feedback device 136. Although not illustrated in FIG. 2, it should be understood that the sensor(s) 204 may also be coupled to the engine 110. The sensor signal(s) comprise measurements of one or more parameters for use in controlling the engine 110 and/or propeller 130. The sensor signal(s) received from the sensor(s) 204 can be electrical signal(s), digital or analog, or any other suitable type of signal.

The sensor(s) 204 may comprise one or more speed sensors configured to acquire measurement(s) of the actual (or current) value of the rotational speed (Np) of the propeller 130. The sensor(s) 204 may also comprise one or more accelerometers configured to acquire measurement(s) of the actual value of the acceleration of the propeller 130. The speed and/or acceleration measurement(s) acquired by the sensor(s) 204 are then provided to the controller 202. It should however be understood that, in some embodiments, rather than being directly received at the controller 202 from the sensor(s) 204, the propeller speed may be calculated based on one or more other engine and/or aircraft parameters measured using the sensor(s) 204.

The sensor(s) 204 are also configured to measure the actual value of the blade angle of the propeller 130 and to provide this measurement to the controller 202. In one embodiment, the sensor(s) 204 comprise one or more sensors configured to magnetically detect the passing of the position markers provided on the feedback device 136. Detection of the position of the markers near the sensor(s) 204 in turn provides, based on the markers' physical geometry, an indication of the position of the feedback device 136 and an indication of the propeller blade angle. It should be understood that, in some embodiments, a single sensor 204 may be used to obtain the propeller blade angle measurements and the propeller speed measurements. Indeed, the same sensor signal may be used to determine the propeller speed and the position of the feedback device 136, which in turn indicates the propeller blade angle. More specifically, in some embodiments, the frequency of the sensor signal may be used to determine the propeller speed and the phase of the sensor signal may be used to determine the position of the feedback device 136 and calculate the propeller blade angle.

In some embodiments, the sensor(s) 204 produce a signal pulse in response to detecting the presence of a position marker in a sensing zone of the sensor 204. For example, the sensor 204 may be an inductive sensor that operates on detecting changes in magnetic flux, and may have a sensing zone which encompasses a circular or rectangular area or volume in front of the sensor 204. The position markers provided on the feedback device 136 may then be made of any suitable material which would cause the passage of the position markers near the sensor(s) 204 to provide a change in magnetic permeability within the magnetic field generated by the sensor 204. When a position marker is present in the sensing zone, or passes through the sensing zone during displacement of the feedback device 136, the magnetic flux in the sensing zone is varied by the presence of the position marker (in other words, a change in magnetic permeability occurs), and the sensor(s) 204 can produce a signal pulse, which forms part of the sensor signal. Parameters characterizing the sensor signal(s) are decoded by the controller 202 (e.g. to provide the signal frequency, phase, amplitude) for estimation of the propeller speed and blade angle. It should however be understood that the sensor 204 may be any suitable sensor other than an inductive sensor, including, but not limited to, a Hall sensor and a variable reluctance sensor.

The signal pulses produced by the sensor 204 can then be used (e.g., by the controller 202) to determine various operating parameters of the engine 110 and the propeller 130. In some embodiments, the sensor signal generated by the sensor 204 may comprise a first series of pulses generated in response to detecting the first (or straight) markers and a second series of pulses generated in response to detecting the second (or angled) marker(s). The spacing (or frequency) of the first markers (which may, or may not, be regular) can, for example, be used to determine a speed of rotation of the feedback device 136. In addition, the second marker(s) can be detected by the sensor 204 to determine a blade angle of the propeller 130.

Based on the sensor signal(s) received from the sensor(s) 204, the controller 202 regulates, via a Propeller Control Unit (PCU) 206, the flow of fluid (e.g., oil) to the propeller 130 in accordance with a reference rotational speed to which the propeller 130 is to be set (or equivalently in accordance with a pre-determined propeller blade angle threshold). In other words, the flow of fluid is regulated to maintain the propeller 130 at the reference speed (or to prevent the propeller 130 from operating at a blade angle exceeding the blade angle threshold). The reference speed (and/or blade angle threshold) is pre-determined and may be obtained by any suitable means, e.g. retrieved from a database, a memory, or other storage medium to which the controller 202 may be communicatively coupled. The value of the reference speed (and/or blade angle threshold) may depend on engine and propeller configuration and is illustratively set to protect the engine 110 from overspeeding. In one embodiment, the most optimal operating speed for operation of the propeller 130 and of the engine 110 is set as the value of the reference speed.

Indeed, when the propeller's actual speed deviates from the reference speed (as determined by the controller 202 based on the received sensor signal(s)), the controller 202 responds with a change in blade angle and commands the PCU 206 to direct fluid under pressure to the propeller 130 or to release (i.e. remove or drain) fluid from the propeller 130. The change in fluid volume going to the propeller 130 causes a change in propeller blade angle, which in turn affects the rotational speed of the propeller 130. Indeed, as known to those skilled in the art, the rotational speed of the propeller 130 is set via modulation of an angle of the blades 134. Fining (i.e. decreasing) the blade angle results in a propeller speed increase and coursing (i.e. increasing) the blade angle results in a propeller speed decrease. For example, increasing the fluid flow (i.e. supplying fluid) to the propeller 130 causes the propeller blades 134 to transfer to a lower pitch angle such that, when the propeller 130 is operating in a forward (i.e., positive) range of pitch angles, the propeller 130 experiences acceleration (i.e., an increase in rotational speed). By way of another example, decreasing the oil flow to (i.e. draining fluid from) the propeller 130 causes the propeller blades 134 to transfer to a higher pitch angle so that, when the propeller 130 is operating in a forward (i.e., positive) range of pitch angles, the propeller 130 experiences deceleration (i.e., a decrease in rotational speed).

More specifically, in one embodiment, the controller 202 transmits a signal or command (also referred to herein as a "PCU command") to the PCU 206, which in turn responds by regulating fluid flow to and from the propeller 130. As discussed further herein, the PCU command may also be generated using any suitable means. The PCU 206 illustratively regulates fluid flow to and from the propeller 130 via an actuator (also referred to as a "pitch angle actuator" or a "blade angle actuator") 208, which is controlled by the controller 202 via the PCU command. The fluid illustratively flows from a fluid source (e.g., a source of oil) provided on the aircraft (e.g. from the engine oil system or from an oil pump of the PCU 206). The actuator 208 can be actuated between a closed position, in which fluid is drained from the propeller 130, and an open position, in which fluid is supplied to the propeller 130, where increasing or decreasing the degree to which the actuator 208 is opened increases or decreases the pressure of the fluid delivered to the propeller 130. Actuation of the actuator 208 therefore selectively allows or prevents fluid flow to and from the propeller 130 and adjusting the position of the actuator 208 may be used to modulate the flow of fluid (i.e. control the rate at which fluid flows) to the propeller 130.

In one embodiment, the actuator 208 is an Electrohydraulic Servo Valve (EHSV) and the controller 202 is configured to output the PCU command that determines a governing current of the EHSV. The governing current governs the opening of the EHSV for controlling the flow of fluid from the fluid source to the propeller 130. In one embodiment, a positive governing current commands oil supply and a negative governing current commands oil drain. In some embodiments, the controller 202 may be configured to set minimum and maximum governing currents for the EHSV, as well as absolute rates of change of the governing current. While the actuator 208 is described herein with reference to an EHSV, it should however be understood that the PCU 206 may include any suitable component, and any suitable arrangement of components, for regulating fluid flow to and from the propeller 130.

In some embodiments, a hydro-mechanical system configured to regulate fluid flow to and from the propeller 130 may be used instead of an EHSV. For example, the hydro-mechanical system may incorporate a set of valves, an overspeed governor, pitch lock mechanism(s), and a mechanical beta system configured to be mechanically actuated (for allowing a reverse range of propeller blade angles) by a Power Lever Angle (PLA) lever mechanically coupled to the beta system. In such embodiments, it may be desirable to provide an electronic control system as a secondary (or back-up) system that monitors propeller speed and blade angle in order to protect the aircraft from unsafe conditions in the event of failure of the primary mechanical system (e.g. due to the PLA lever inadvertently allowing reverse operation in flight or to the overspeed governor failing to react to propeller overspeed). Upon detection of the primary (mechanical) system being inoperable, the secondary electronic system may be configured to provide a suitable accommodation including, but not limited to, activating an independent valve that would initiate the drain of fluid from the propeller 130, or initiating engine shutdown, which would stop fluid flow to and from the propeller 130 and allow for the propeller 130 to be feathered at a slow rate.

It should be understood that any suitable actuating system operable to modulate fluid flow (received from the fluid source) to a desired outflow may be used to regulate fluid flow to and from the propeller 130. In such embodiments, it may be desirable for the actuating system to be operable to supply or drain the entirety or any portion of the received fluid flow. Possible modulating systems include, but are not limited to, electrically-controlled oil pumping systems and electrically-controlled fluid drain control systems. In some embodiments, the actuator 208 may be a mechanical pump which, depending on its drive, provides more or less fluid flow to the downstream system (i.e. to the propeller 130). Alternatively, a set of mechanical valves, which may be operable to bypass (e.g. into the inlet of the PCU fluid pump) a received fluid flow in order to achieve a desired fluid outflow for maintaining the propeller 130 at the reference speed or at a required propeller blade angle, may be used.

Still referring to FIG. 2, the controller 202 is configured to detect a failure of the feedback device 136 on the basis of the PCU command and of the input signal(s) received from the sensor(s) 204. In particular, the controller 202 is configured to detect, based on a reading of the propeller speed and blade angle, that the feedback device 136 is inoperable in its axial movement (i.e., unable to be displaced longitudinally along axis A) and is therefore unable to correctly indicate the propeller blade angle as well as the (inadvertent or expected) transition of the propeller 130 towards a negative or low positive range of blade angles, also referred to herein as a "reverse" range of blade angles. Such a feedback device failure condition can be a result of a failure of the overall propeller system, as well as a mechanical failure of the feedback device 136 (e.g., damage, seizure at one position). For this purpose, the controller 204 monitors the input signal(s) received from the sensor(s) 204 and assesses whether an expected response from the propeller 130 (in terms of blade angle and rotational speed) has been detected in response to the PCU command (e.g., in response to the change in EHSV current commanded by the controller 202).

As will be discussed further below, detection of an expected change in the propeller rotational speed and of the propeller rotational speed being maintained at the reference speed accompanied with an expected change in propeller blade angle failing to be reported provides an indication of failure of the feedback device 136. As will be discussed further below, the controller 202 is configured to generate and output an alert as well as proceed with accommodation of the failure of the feedback device 136 upon detection thereof. In one embodiment, the alert is a warning indication or message that is output for annunciation in the aircraft cockpit in order to inform the crew of the malfunction of the feedback device 136 (i.e. of the feedback device 136 being inoperable in its axial movement). The pilot and/or crew may in turn take over control of the aircraft and take appropriate action by applying a specific procedure to protect the aircraft from unsafe flight conditions that can be induced by the malfunction of the feedback device 136. In particular, the pilot and/or crew may take the necessary measure(s) to prevent the propeller 130 from inadvertently operating in a reverse mode (i.e. to prevent the propeller blade angle from inadvertently transitioning towards negative or low range blade angles, which would cause application of reverse thrust and result in excessive drag for the aircraft). For example, application of idle (or low) engine power may be prohibited.

Figure 3:
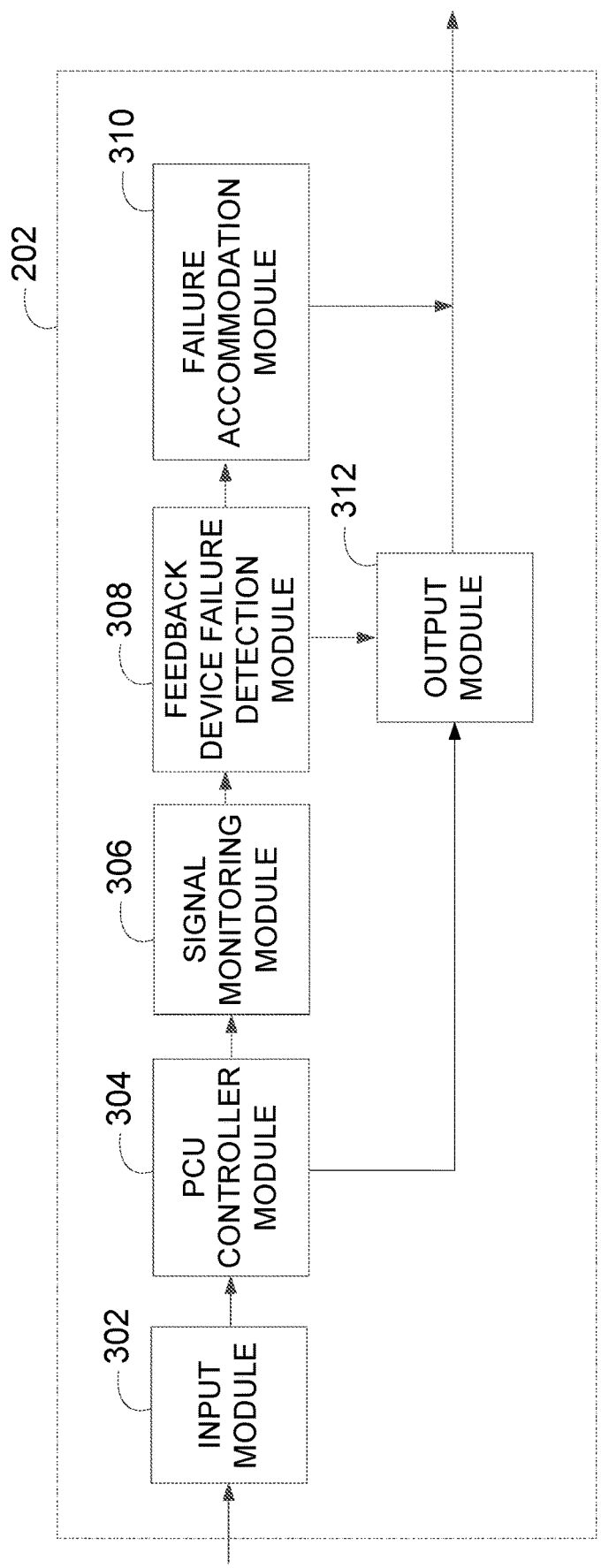
FIG. 3 is a block diagram of the controller of FIG. 2, in accordance with an illustrative embodiment.

Referring to FIG. 3, there is illustrated an example embodiment of the controller 202. The controller 202 may be an Engine & Propeller Electronic Control (EPEC) system, an engine controller, such as a Full Authority Digital Engine Control (FADEC), an electronic propeller control system, an Engine Electronic Control (EEC), an Engine Control Unit (ECU), or the like. In the embodiment illustrated in FIG. 3, the controller 202 comprises an input module 302, a PCU controller module 304, a signal monitoring module 306, a feedback device failure detection module 308, a failure accommodation module 310, and an output module 312.

As previously noted and as will be discussed further below, the controller 202 is configured to detect a condition of the feedback device (reference 136 in FIG. 2) being inoperable in its axial movement by monitoring the propeller speed and propeller blade angle in relation to the PCU command. For this purpose, the input module 302 receives one or more input signals comprising an actual value of the propeller speed and propeller blade angle as obtained from measurements acquired by the sensor(s) (reference 204 in FIG. 2) coupled to the propeller 130 and/or feedback device 136. These input signal(s) are then provided to the PCU controller module 304 for processing.

The PCU controller module 304 is configured to generate and output the PCU command that would allow to achieve an expected propeller position or speed, based on the sensor signal(s) received from the input module 302. In particular, the PCU controller module 304 estimates the PCU actuator command (e.g., the EHSV governing current) that is needed to position the propeller blades (reference 134 in FIG. 1) at a different angle in order to maintain the propeller 130 at the reference speed (or equivalently the command needed to prevent the propeller 130 from exceeding specific thresholds of the propeller blade angle). The PCU controller module 304 may then send the PCU command to the output module 312 for transmission to the PCU actuator (reference 206 in FIG. 2), for use in adjusting the propeller blade angle and the propeller speed.

The sensor signal(s) and the PCU command may further be provided to the signal monitoring module 306, which is configured to confirm that the received signals are healthy. In particular, the signal monitoring module 306 is configured to assess whether the sensor signal(s) are within range and failure free. This may be achieved by the signal monitoring module 306 verifying the speed and blade angle reading(s) from multiple sources. For example, the propeller control system may comprise a control system (referred to herein as a "propeller control system") configured to implement a control function for the propeller and a protection system (referred to herein as a "propeller protection system") configured to implement a protection function for the propeller. The propeller control system and the propeller protection system may be independent controllers, that may be configured to receive inputs on propeller speed and blade angle from independent, dedicated sensors (e.g., one sensor providing input to the propeller control system and one sensor providing input to the propeller protection system). It should however be understood that the propeller control system and the propeller protection system may be integrated in a single electronic unit.

In some embodiments, the propeller control system may have a dual channel configuration. Such a propeller control system may be configured to perform control over the propeller speed and blade angle with independence between the two channels (e.g., with each channel receiving signals from a dedicated sensor). It should be understood that both the propeller control system and the propeller protection system may have a single or dual channel configuration.

In one embodiment, the propeller protection system may receive the propeller speed and blade angle reading(s) from a dedicated sensor. Depending on configuration, the sensor may be equipped with a single coil (for single channel configuration) or with dual measuring coils (for dual channel configuration), with one coil used for reading and sending signals to each of two protection channels. The propeller control system may similarly receive the propeller speed and blade angle reading(s) from a dedicated sensor. Depending on configuration, the sensor may be equipped with a single coil (for single channel configuration) or with dual measuring coils (for dual channel configuration), with one coil used for reading and sending signals to each of two propeller control channels.

Redundancy in rotational speed and blade angle reading(s) by the two channels of the propeller protection system and by the propeller control system relying on the reading from another independent sensor allows for accommodation in case of detected deviation in propeller speed or blade angle reading. The deviation may be considered as a discrepancy between both readings of the control system performing the propeller control function and continuously monitoring the propeller speed and blade angle. The deviation may also be considered as a discrepancy between the control reading and the protection reading. Accommodation for the detected deviation may be designed as a selection logic where, in the event of multiple readings being available (e.g., two readings from both control channels and single or dual readings from the propeller protection system), a single outstanding reading would be considered as faulty and further propeller control would be performed in accordance to the other consistent readings.

The signal monitoring module 306 may consider a predetermined range of the propeller speed and blade angle as the propeller's operating range. As such, any propeller speed and blade angle reading that is out of the expected operating range would be considered by the signal monitoring module 306 as a faulty reading.

In addition, the signal monitoring module 306 may also consider the rate of change of the propeller speed and blade angle in relation to predefined criteria (or thresholds) that may be mechanically achievable by the propeller system. In other words, any propeller speed and blade angle reading that is beyond the expected rate of range in propeller speed and blade angle would be considered by the signal monitoring module 306 as indicative of a faulty reading.

The signal monitoring module 306 may also compare the propeller speed reading to an expected propeller speed, which may be estimated based on the measurement of the rotational speed of the engine power turbine (reference 122 in FIG. 1A), which, as described herein above, drives the propeller shaft (reference 124 in FIG. 1A) through the RGB (reference 126 in FIG. 1A) or based on other engine operating parameters (e.g. allowing for the propeller control system to detect and accommodate for errors in propeller speed or blade angle reading by any channel when the propeller protection system described above is not implemented). Any propeller speed reading that deviates from the estimated propeller speed would be considered by the signal monitoring module 306 as a faulty reading.

The signal monitoring module 306 may also detect a lost or corrupted propeller speed and blade angle signal. In particular, a propeller speed and blade angle reading (i.e. signal) that is lost or deviates in a pre-defined manner (e.g., oscillating readings of excessive speed amplitude or intermittent loss) would be considered by the signal monitoring module 306 as a faulty reading.

The signal monitoring module 306 considers the propeller speed and blade angle reading as healthy if the readings are not detected as being faulty based on any of the pre-defined fault detection conditions described herein above (or by any other suitable condition defined in the signal monitoring module 306).

The signal monitoring module 306 is further configured to confirm that the PCU command (i.e. a current request to the actuator, reference 208 in FIG. 2) is healthy (i.e. failure-free). In one embodiment, the signal monitoring module 306 (or alternatively a separate PCU actuator controller) may be using feedback from the actuator 208 to control the governing current, and for fault detection of the PCU 206 and/or of the actuator 208. The signal monitoring module 306 performs continuous monitoring of the propeller speed and blade angle as well as of the PCU command. The monitoring of the PCU command may be performed after the PCU command is provided from the PCU controller module 304, thus allowing for monitoring of the feedback in relation to the provided command. In particular, the signal monitoring module 306 may be configured to compare the commanded governing current (e.g. by monitoring of the feedback current from the actuator 208 and/or PCU 206) to the maximum governing current. If the commanded governing current exceeds the maximum governing current, overcurrent is detected and the signal monitoring module 306 determines that the PCU command is faulty.

In some embodiments, errors in processing the PCU command by the actuator 208 may be detected upon receipt of an erroneous response to the provided governing current (e.g., a requested increase/decrease in PCU command for acceleration or deceleration of the propeller 130 failing to be followed by a propeller acceleration or deceleration, or by detecting that the time it takes for the propeller 130 to achieve the reference speed is longer than a maximum time required for executing the PCU command).

The signal monitoring module 306 may be configured to detect a lost, erroneous or corrupted commanded governing current (e.g., lost feedback, intermittent feedback reading, or mismatch between command and feedback). A PCU command and/or feedback that is lost or deviates in pre-defined manner (e.g. PCU feedback begins to be intermittent, or begins to deviate from the PCU command) would be considered by the signal monitoring module 306 (or alternatively a separate PCU actuator controller) as faulty.

The signal monitoring module 306 may also be configured to detect any discrepancy between the provided PCU command and the recorded response of the propeller 130. Any discrepancy between the provided governing current and the expected rate of change in propeller speed or blade angle would allow to detect that the PCU command is faulty (i.e. that the PCU command estimated for maintaining or reaching the propeller reference speed or a specific blade angle does not result in the expected propeller speed or blade angle).

The signal monitoring module 306 would consider the PCU command (and PCU feedback) as healthy if the signals are not detected as being faulty based on any of the pre-defined fault detection conditions described herein above.

In one embodiment, the controller 202 is a dual-channel controller. In this embodiment, when a faulty signal (i.e., a faulty sensor signal and/or a faulty PCU command) is detected using one channel (i.e. on an active channel) of the controller 202, the controller 202, and particularly the signal monitoring module 306, switches to the other channel (i.e. a standby channel) and obtains failure free sensor signal(s) and/or PCU command from this other channel. The signal monitoring module 306 then provides the failure-free sensor signal(s) and/or PCU command to the feedback device failure detection module 308 for use by the feedback device failure detection module 308 in detecting failure of the feedback device 136.

Based on the failure-free signals it receives, the feedback device failure detection module 308 compares the actual value of the propeller speed to the reference speed and monitors the actual value of the propeller blade angle to determine whether an expected blade angle value has been reached. In one embodiment, the actual value of the propeller blade angle may be compared to the blade angle value obtained in a previous clock cycle in order to determine whether an expected change (e.g., increase or decrease) in the propeller blade angle has been achieved in response to the PCU command. In another embodiment, the actual value of the propeller blade angle may be compared to a blade angle threshold (e.g., a minimum blade angle or a maximum blade angle corresponding to a full feather position), in order to determine whether the expected change in the propeller blade angle has been achieved.

The comparison of the actual value of the propeller speed to the reference speed may include comparing the actual value of the rotational speed to the reference speed itself, to a value based thereon (e.g., 95% of the reference speed), to a range of values including the reference speed, and the like. Similarly, the actual value of the propeller blade angle may be compared to the blade angle threshold itself, to a value based thereon (e.g., 95% of the blade angle threshold), a range of values including the blade angle threshold, and the like. It should be noted that the actual propeller speed may be considered to meet (i.e. be maintained at) the reference speed when a difference between the actual propeller speed and the reference speed is below a predetermined amount, or when the actual propeller speed and the reference speed are within a particular range, or the like. Similarly, the actual propeller blade angle may be considered to meet the blade angle threshold when a difference between the actual propeller blade angle and the blade angle threshold is below a predetermined amount, or when the actual propeller blade angle and the blade angle threshold are within a particular range, or the like.

If it is determined, based on the comparison, that the expected change in propeller speed has occurred and the propeller speed has been maintained at the reference speed (i.e. is within a given predetermined range of the reference speed) but the expected change in the propeller blade angle (i.e. the change in blade angle expected to maintain the propeller 130 at the reference speed) has not been detected, the feedback device failure detection module 308 detects a failure of the feedback device 136, i.e. that the feedback device 136 is inoperable in its axial movement and unable to provide accurate information about the propeller blade angle.

In particular, the PCU command may be output to adjust the blade angle in order to achieve acceleration or deceleration of the propeller 130 to maintain the propeller 130 at reference speed. As described herein above, the PCU command may be output by the controller 202 (or generated using any suitable means described above) and may comprise instructions to increase the governing current of the actuator 208 in order to achieve acceleration of the propeller 130. If the sensor signal(s) indicate that, in response to the PCU command, the rotational speed of the propeller 130 has indeed been increased towards the reference speed (i.e. the actual value of the propeller rotational speed matches the reference speed) but the corresponding propeller transition towards lower blade angles (e.g. towards the minimum blade angle) has not been detected and the propeller blade angle remains unchanged (i.e. the expected decrease in propeller blade angle has, according to the sensor readings, failed to occur), the feedback device failure detection module 308 detects failure of the feedback device 136 (i.e. that the feedback device 136 is inoperable in its axial movement since no change in propeller blade angle was detected).

Conversely, as described above, the PCU command may be output (e.g., by the controller 202 or generated using any suitable means) to adjust the blade angle in order to achieve deceleration of the propeller 130 to maintain the propeller 130 at reference speed. As described herein above, the PCU command may comprise instructions to decrease the governing current of the actuator 208 in order to achieve deceleration of the propeller 130. If the sensor signal(s) indicate that, in response to the PCU command, the rotational speed of the propeller 130 has indeed been decreased towards the reference speed but the corresponding propeller transition towards higher blade angles (e.g. towards the full feather position) has not been detected and the propeller blade angle remains unchanged (i.e. the expected increase in propeller blade angle has, according to the sensor readings, fail to occur), the feedback device failure detection module 308 detects failure of the feedback device 136.

In some embodiments, the feedback device failure detection module 308 may be configured to continuously monitor the change in propeller speed and the change in propeller blade angle. It should however be understood that, in some embodiments, the propeller blade angle readings (e.g., as received form the sensor(s) 204) may not be available over the entire range of propeller blade angles (i.e. may only be available over a limited range). In these embodiments, the feedback device failure detection module 308 may be configured to monitor the feedback device 136 and perform failure detection over the available range of propeller blade angles. For example, in some embodiments, the propeller blade angle may not be read (i.e. not available) in a higher range of blade angles (e.g. between 90°-60°) and the feedback device failure detection module 308 may be configured to perform feedback device failure detection based on readings obtained over the available (lower) range of propeller blade angles. If a reading within the available range fails to be obtained (e.g., from the sensor(s) 204), the feedback device failure detection module 308 may then detect failure of the feedback device 136.

In some embodiments, the feedback failure detection module 308 may be configured to monitor engine power in order to perform failure detection. In particular, acceleration of the engine power turbine (i.e. higher engine power) would be expected to operate the propeller 130 towards higher propeller blade angles in order to maintain the propeller 130 at reference speed. Similarly, deceleration of the engine power turbine (i.e. lower engine power) would be expected to operate the propeller 130 towards lower angles for maintaining the propeller 130 at reference speed. If the engine power fails to change while the propeller 130 decelerates below the reference speed, the propeller blade angle would be expected to transition towards lower angles in order for the propeller 130 to maintain the reference speed. Similarly, if the engine power fails to change while the propeller 130 accelerates above the reference speed, the propeller blade angle would be expected to transition towards higher angles in order for the propeller 130 to maintain the reference speed. The feedback failure detection module 308 may therefore monitor engine power to determine the expected propeller response and detect failure of the feedback device 136.

In one embodiment, when the feedback device failure detection module 308 determines that the propeller speed has changed as expected and has been maintained at the reference speed but there has been no reported change in propeller blade angle, the feedback device failure detection module 308 assesses whether the condition has been persisting for a period of time greater than a pre-determined duration, referred to herein as a pre-defined "latch time". The latch time may vary depending on engine configuration and may be obtained by any suitable means, e.g. retrieved from a database, a memory, or other storage medium to which the controller 202 may be communicatively coupled. If it is determined that the condition has persisted for a period of time that exceeds the latch time, the feedback device failure detection module 308 confirms that the feedback device failure condition is indeed present.

As discussed herein above, in one embodiment where the controller 202 is a dual-channel controller, the feedback device failure detection module 308 may be configured to confirm the detection criteria mentioned above on both controller channels. This may allow for improved robustness and for protection against incorrect or misleading detection of failure of the feedback device 136. In other words, the feedback device failure detection module 308 may be configured to request confirmation of the feedback device failure detection conditions on both the active channel and the standby channel.

Upon detection of failure (i.e. inoperable axial movement) of the feedback device 136, the output module 312 generates a warning indication or message indicative of the failure and the warning indication is provided to an aircraft output (reference 210 in FIG. 2) for cockpit annunciation. Cockpit annunciation may be performed using any suitable means, such as by visual rendering of the warning indication on display(s) provided in the cockpit of the aircraft and/or audio output using any suitable audio output device provided in the aircraft. In one embodiment, the aircraft output 210 is an Aeronautical Radio Inc. (ARINC) output that uses the ARINC 429 data transfer standard for aircraft avionics to output the warning indication. Other data standards may also be used, such as ARINC 615, ARINC 717, and MIL-STD-1553.

The failure accommodation module 310 may further be used to accommodate the failure detected by the feedback device failure detection module 308. Such accommodation procedure may entail preventing the propeller 130 from being inadvertently directed towards a reverse range of blade angles. For example, the propeller blade angle may be prevented from exceeding a minimum positive blade angle. This may be achieved using any suitable accommodation procedure including, but not limited to, commanding the propeller to feather, commanding the engine power to idle in addition to commanding the propeller to feather, or adjusting the PCU command to limit the governing current in order to restrict (or drain) the volume of fluid exchanged between the blade angle actuator and the source of fluid and prevent the blade angle from being adjusted towards a reverse range. For example, the governing current may be limited to a value that corresponds to no movement of the actuator 208 (e.g., of the EHSV). The controller 202 may in turn only govern the propeller system in the direction of full feather, such that the controller 202 would only allow propeller deceleration and would prevent propeller acceleration (and prevent transition of the propeller 130 towards lower blade angles). Control over the propeller speed may then be taken by the pilot and/or crew, which may modulate (e.g., add) engine power in order to accelerate the propeller 130 and optimize thrust for completing the flight. It should however be understood that the accommodation procedure may vary depending engine and propeller configuration, as well as on the probability and on the criticality of the feedback device failure.

Figure 4:
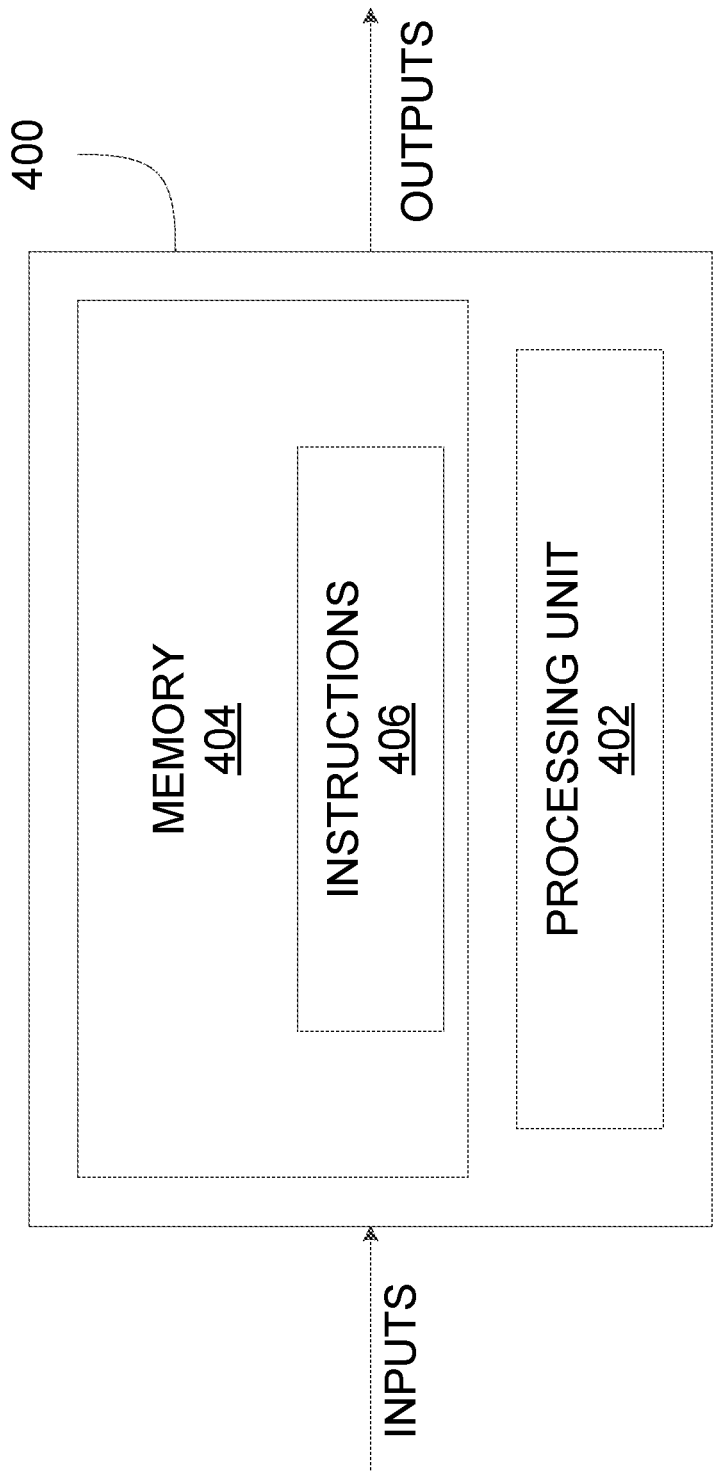
FIG. 4 is a block diagram of an example computing device for implementing the controller of FIG. 2, in accordance with an illustrative embodiment.

FIG. 4 is an example embodiment of a computing device 400 for implementing the controller 202 described above with reference to FIG. 2. The computing device 400 comprises a processing unit 402 and a memory 404 which has stored therein computer-executable instructions 406. The processing unit 402 may comprise any suitable devices configured to cause a series of steps to be performed such that instructions 406, when executed by the computing device 400 or other programmable apparatus, may cause the functions/acts/steps specified in the method described herein to be executed. The processing unit 402 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

Figure 5:
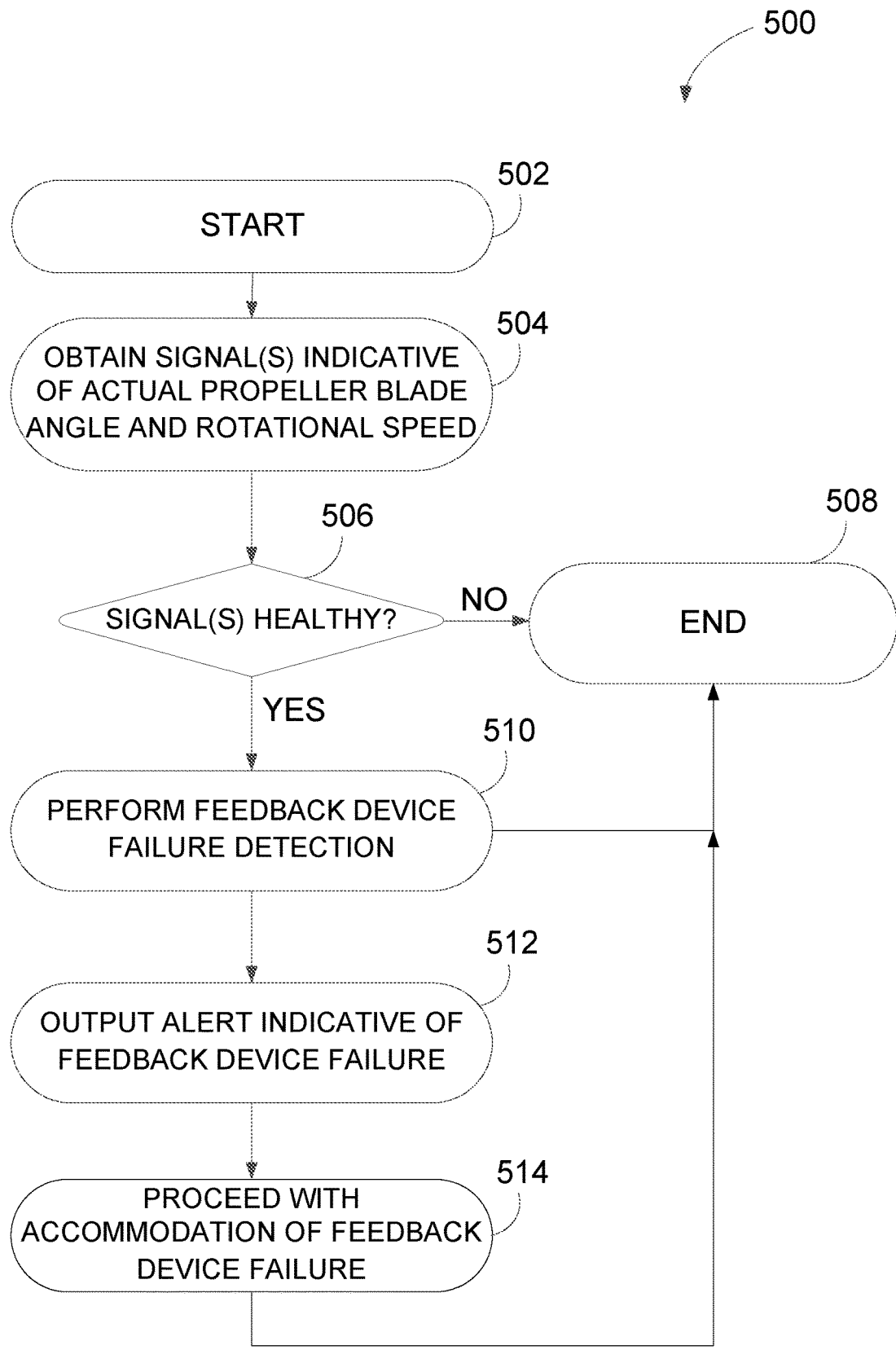
FIG. 5 is a flowchart of a method for detecting failure of a feedback device, in accordance with an illustrative embodiment.

Referring now to FIG. 5, a method 500 for detecting failure of a propeller feedback device will now be described in accordance with one embodiment. The method 500 is illustratively performed by a controller (such as the controller 202 in FIG. 2). The method 500 comprises, after start (502), The method 500 further comprises, at step 504, obtaining input signal(s) indicative of an actual value of the blade angle and rotational speed of the propeller. The input signal(s) may be received from one or more sensor(s) coupled to the engine, the propeller, and/or the feedback device, in the manner described herein above with reference to FIG. 2 and FIG. 3. As discussed above, the signal(s) are obtained a predetermined time delay after a PCU command is generated (by the controller, reference 202 in FIG. 2, or in any other suitable manner), continuously or at pre-determined time intervals. As described above, in one embodiment, the controller generates the PCU command needed to vary the position of the propeller blades in order to maintain the propeller at the reference speed and outputs the PCU command to the PCU (reference 206 in FIG. 2). In one embodiment, as discussed herein above, the controller calculates the oil flow needed to obtain the desired propeller reference speed and generates the PCU command indicative of the governing current needed to achieve the desired oil flow.

The next step 506 comprises a determination as to whether the one or more signals obtained at step 504 are healthy (i.e. within range and failure-free), in the manner described herein with reference to FIG. 2 and FIG. 3. In addition to assessing whether the input (i.e. sensor) signal(s) are healthy, step 506 may comprise assessing whether the PCU command is healthy (as discussed above). If it is determined at step 506 that the one or more signals are not healthy, the method 500 ends at step 508. Otherwise, the method 500 proceeds with performing feedback device failure detection at step 510, based on the failure-free signal(s). When it is determined (at step 510) that the feedback device is functioning properly, the method may end at step 508. Otherwise, an alert indicative of failure of the feedback device (i.e. indicating that the axial movement of the feedback device is inoperable) is output at step 512, e.g. for cockpit annunciation. The next step 514 is then to proceed with accommodation of the feedback device failure detected at step 510.

Figure 6:
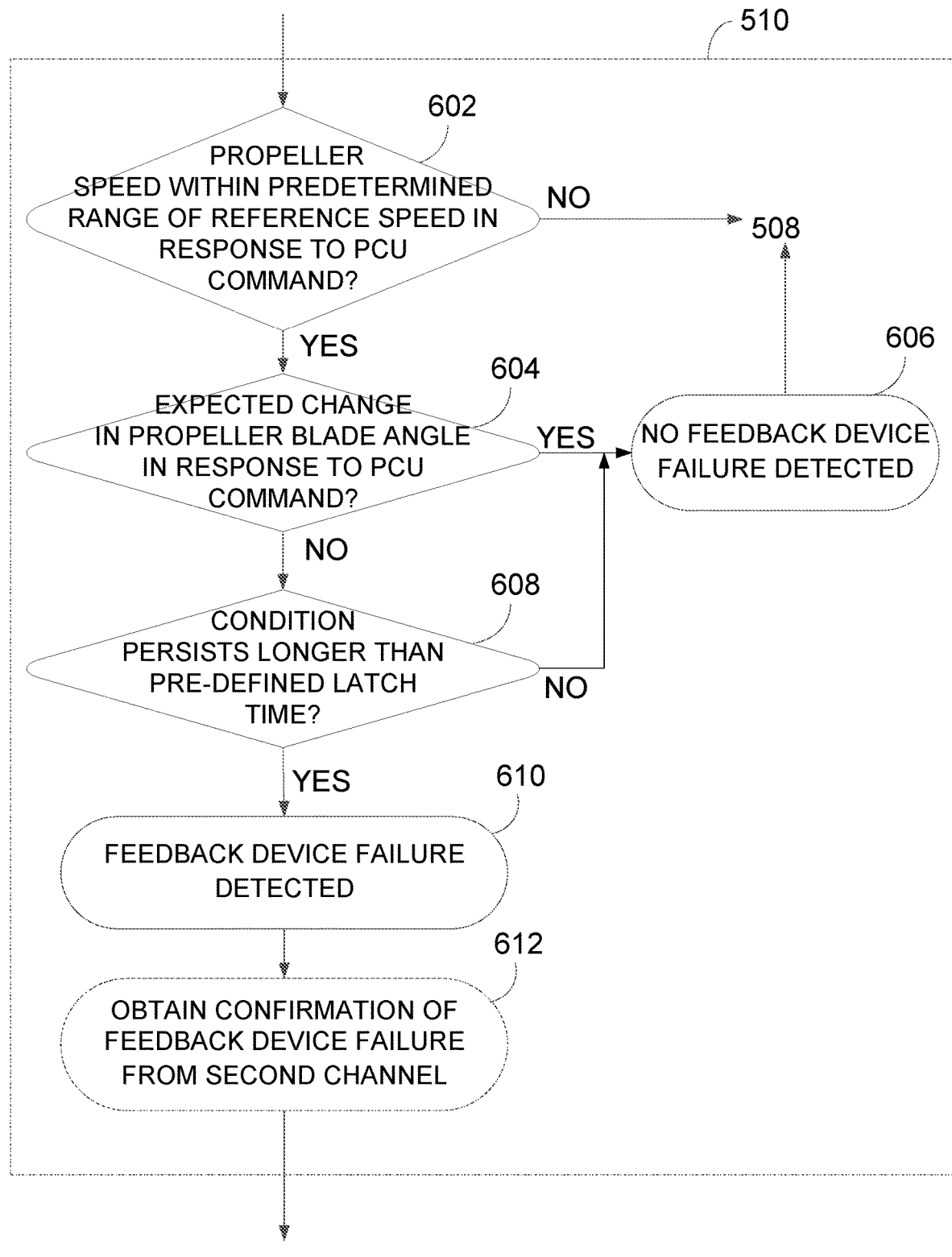
FIG. 6 is a flowchart of the step of FIG. 5 of performing feedback device failure detection, in accordance with an illustrative embodiment.

Referring now to FIG. 6 in addition to FIG. 5, the step 510 of performing feedback device failure detection comprises determining, at step 602, whether the propeller speed is within a predetermined range of the reference speed. For this purpose, step 602 comprises assessing whether an expected change in the rotational speed of the propeller has occurred in response to the PCU command and whether the rotational speed of the propeller has been maintained at the reference speed, in response to the PCU command. In other words, as discussed above, step 602 comprises assessing whether the propeller speed has changed as expected to maintain the reference speed, i.e. has either accelerated in the event of propeller underspeed below the reference speed, or decelerated in the event of propeller overspeed above the reference speed. This assessment is illustratively performed on the basis of the input signal(s) received at step 504 (i.e. on the basis of the actual value of the rotational speed of the propeller), in the manner described herein above with reference to FIG. 2 and FIG. 3. If it is determined at step 602 that the rotational speed of the propeller fails to be within the predetermined range of the reference speed (i.e. the expected change in propeller speed has failed to occur and the propeller speed failed to be maintained at the reference speed) in response to the PCU command, the method 500 ends (step 508). Otherwise, if it is determined at step 602 that the rotational speed of the propeller is within the predetermined range of the reference speed (i.e. the expected change in propeller speed has occurred and the propeller speed has been maintained at the reference speed in response to the PCU command), the next step 604 is to assess whether an expected change (e.g., towards lower or higher blade angles) in the blade angle of the propeller has been detected in response to the PCU command. This assessment is illustratively performed on the basis of the input signal(s) received at step 504 (i.e. on the basis of the actual value of the blade angle of the propeller), in the manner described herein above with reference to FIG. 2 and FIG. 3. If it is determined at step 604 that the expected change in the blade angle of the propeller has indeed been detected in response to the PCU command, as determined from the received input signal(s), no failure of the feedback device is detected (step 606) and the method 500 may end (step 508).

Otherwise, if it is determined at step 604 that the expected change in the blade angle of the propeller has not been detected in response to the PCU command, the next step 608 is to assess whether this condition (i.e. propeller speed being within the predetermined range of the reference speed detected but expected change in propeller blade angle not detected) has persisted for a period of time longer than (i.e. exceeding) a pre-defined latch time. If this is not the case, the method 500 ends (step 508). Otherwise, if it is determined at step 608 that the propeller speed is within the predetermined range of the reference speed and the expected change in propeller blade angle has not been detected for a time period exceeding the latch time, failure of the feedback device is detected at step 610. In embodiments where a dual-channel controller is used to perform feedback device failure detection, step 610 entails detecting the feedback device failure on the first (i.e. active) channel. The next step 612 may then be to obtain a confirmation of the feedback device failure from the second (i.e. standby) channel. After the feedback device failure has been detected (step 610) and optionally confirmed on both channels (step 612), an alert indicative of this condition is then generated for output to the cockpit (step 512) in the manner described herein above.

Figure 7:
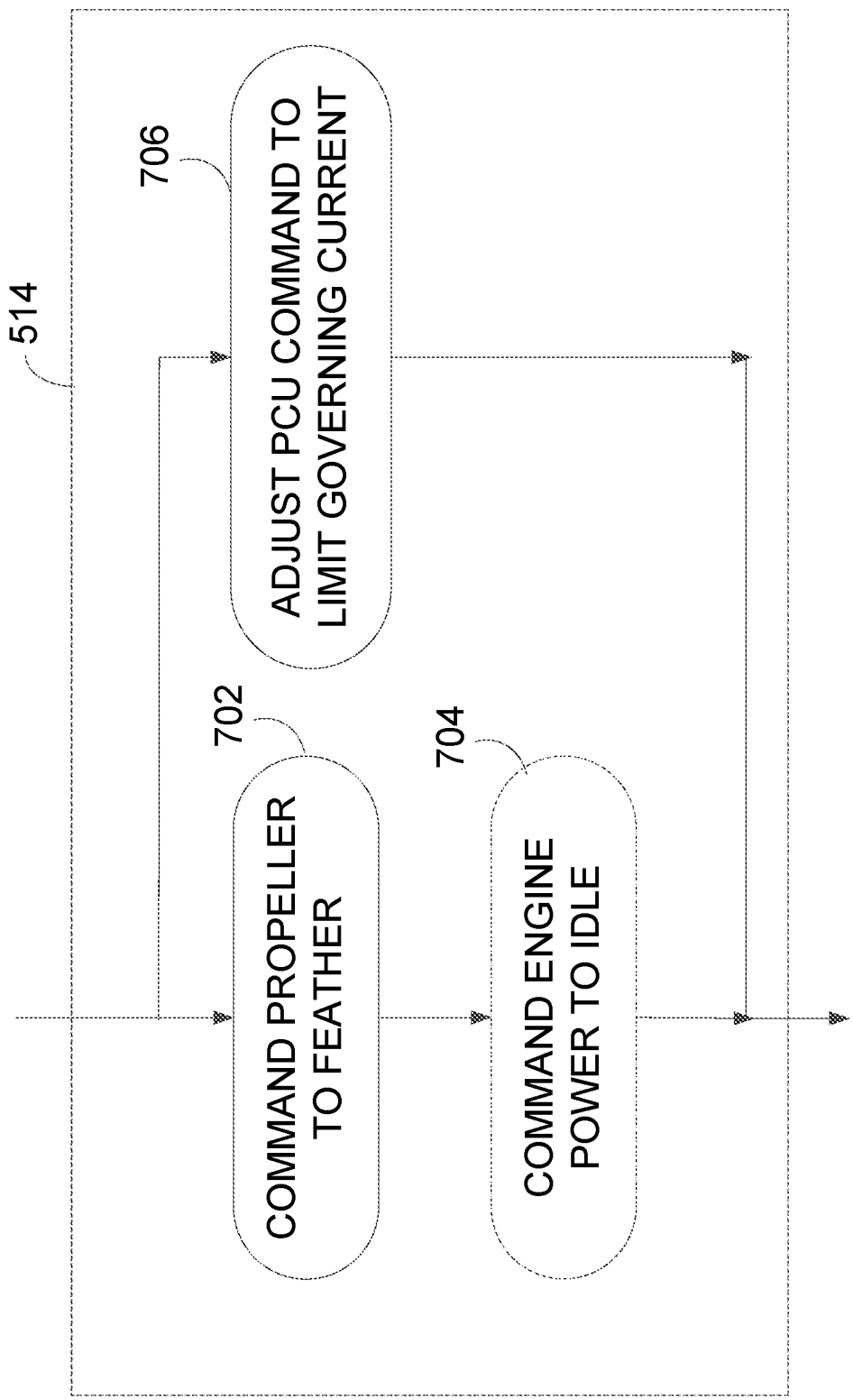
FIG. 7 is a flowchart of the step of FIG. 6 of proceeding with accommodation of a detected feedback device failure, in accordance with an illustrative embodiment.

Referring now to FIG. 7, in one embodiment, the step 514 of proceeding with accommodation of the detected feedback failure comprises commanding the propeller to feather (step 702). In yet another embodiment, the step 514 of triggering accommodation for the detected feedback failure comprises commanding the engine power to idle (step 704) in addition to commanding the propeller to feather (step 702). In some other embodiments, the step 514 of triggering accommodation for the detected feedback failure comprises adjusting the PCU command to limit the governing current in order to prevent the propeller from being directed towards a reverse range of blade angles (step 706). It should be understood that the accommodation to be performed at step 5143 may be determined based on engine configuration, as well as on the probability and on the criticality of the feedback device failure. As such, other embodiments may apply.

In one embodiment, the systems and methods described herein may allow for protection against potentially catastrophic aircraft risks (e.g., inadvertent reverse operation) in flight. The systems and methods described herein may therefore enable an airframer to meet aircraft certification requirements (e.g., those imposed on the feedback device of the propeller feedback system) for applications of elevated criticality.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for detecting failure of a feedback device for detecting a parameter of a propeller driven by an engine, the method comprising:

at a computing device,
receiving at least one sensor signal from at least one sensor, the at least one sensor signal produced by the at least one sensor in response to relative movement between the feedback device and the at least one sensor, one of the feedback device and the at least one sensor moving along an axis with adjustment of a blade angle of the propeller, the at least one sensor signal indicative of a rotational speed and of the blade angle of the propeller;
determining, from the at least one sensor signal, whether the rotational speed of the propeller is within a predetermined range of a reference speed and an expected change in the blade angle of the propeller has occurred in response to a command to adjust the blade angle of the propeller to maintain the rotational speed of the propeller at the reference speed;
determining a period of time during which the rotational speed of the propeller has been within the predetermined range of the reference speed and the expected change in the blade angle of the propeller has failed to occur, comparing the period of time to a pre-determined duration, and determining that the movement of the one of the feedback device and the at least one sensor along the axis is inoperable response to determining that the period of time exceeds the pre-determined duration; and
in response to determining, from the at least one sensor signal, that the rotational speed of the propeller is within the predetermined range of the reference speed and the expected change in the blade angle of the propeller has failed to occur in response to the command, outputting an alert.

2. The method of claim 1, further comprising outputting the command in order to cause a fluid to be exchanged between a blade angle actuator of the propeller and a source of the fluid to adjust the blade angle of the propeller.

3. The method of claim 2, further comprising outputting the command in order to cause adjustment of a governing current that controls actuation of a valve operable to selectively fluidly connect the blade angle actuator with the source of the fluid.

4. The method of claim 1, further comprising outputting the command to adjust the blade angle of the propeller in order to increase the rotational speed of the propeller towards the reference speed, and further wherein the determining, from the at least one sensor signal, whether the expected change in the blade angle of the propeller has occurred in response to the command comprises determining, from the at least one sensor signal, whether the blade angle of the propeller has decreased in response to the command.

5. The method of claim 1, further comprising outputting the command to adjust the blade angle of the propeller in order to decrease the rotational speed of the propeller towards the reference speed, and further wherein the determining, from the at least one sensor signal, whether the expected change in the blade angle of the propeller has occurred in response to the command comprises determining, from the at least one sensor signal, whether the blade angle of the propeller has increased in response to the command.

6. The method of claim 3, wherein the command is output to cause the governing current to be increased, and further wherein the determining, from the at least one sensor signal, whether the rotational speed of the propeller is within the predetermined range of the reference speed in response to the command comprises determining, from the at least one sensor signal, whether the rotational speed of the propeller has increased towards the reference speed in response to the command.

7. The method of claim 3, wherein the command is output to cause the governing current to be decreased, and further wherein the determining, from the at least one sensor signal, whether the rotational speed of the propeller is within the predetermined range of the reference speed in response to the command comprises determining, from the at least one sensor signal, whether the rotational speed of the propeller has decreased towards the reference speed in response to the command.

8. The method of claim 1, wherein the feedback device is operatively coupled to the propeller for rotation therewith, the determining that movement of the one of the feedback device and the at least one sensor along the axis is inoperable comprises determining that movement of the feedback device along the axis is inoperable, and wherein the movement of the feedback device along the axis being inoperable is determined in response to determining, on either of a first controller channel and a second controller channel, that the rotational speed of the propeller is within the predetermined range of the reference speed and that the expected change in the blade angle of the propeller has failed to occur.

9. The method of claim 1, wherein the outputting the alert comprises generating a warning message indicative of the movement of the feedback device along the axis being inoperable and outputting the warning message for cockpit annunciation.

10. The method of claim 8, further comprising, in response to determining that movement of the feedback device along the axis is inoperable, outputting a subsequent command to cause the propeller to feather.

11. The method of claim 8, further comprising, in response to determining that movement of the feedback device along the axis is inoperable, outputting a subsequent command to cause the propeller to feather and to bring a power of the engine to idle.

12. The method of claim 3, further comprising, in response to determining that movement of the one of the feedback device and the at least one sensor along the axis is inoperable, outputting a subsequent command to cause the governing current to be limited in order to restrict a volume of the fluid exchanged between the blade angle actuator and the source of the fluid and prevent the blade angle from being adjusted towards a reverse range.

13. A system for detecting failure of a feedback device in an engine system including an engine and a propeller driven by the engine to rotate about an axis, the system comprising:
a processing unit; and
a non-transitory computer readable medium having stored thereon program code executable by the processing unit for:
receiving at least one sensor signal from at least one sensor, the at least one sensor signal produced by the at least one sensor in response to relative movement between the feedback device and the at least one sensor, one of the feedback device and the at least one sensor moving along the axis with adjustment of a blade angle of the propeller, the at least one sensor signal indicative of a rotational speed and of the blade angle of the propeller;
determining, from the at least one sensor signal, whether the rotational speed of the propeller is within a predetermined range of a reference speed and an expected change in the blade angle of the propeller has occurred in response to a command to adjust the blade angle of the propeller to maintain the rotational speed of the propeller at the reference speed;
determining a period of time during which the rotational speed of the propeller has been within the predetermined range of the reference speed and the expected change in the bade angle of the propeller has failed to occur, comparing the period of time to a pre-determined duration, and determining that the movement of the one of the feedback device and the at least one sensor along the axis is inoperable in response to determining that the period of time exceeds the pre-determined duration; and
in response to determining, from the at least one sensor signal, that the rotational speed of the propeller is within the predetermined range of the reference speed and the expected change in the blade angle of the propeller has failed to occur in response to the command, outputting an alert.

14. The system of claim 13, wherein the program code is executable by the processing unit for outputting the command comprising instructions to cause a fluid to be exchanged between a blade angle actuator of the propeller and a source of the fluid to adjust the blade angle of the propeller.

15. The system of claim 14, wherein the program code is executable by the processing unit for one of:
outputting the command comprising instructions for adjusting the blade angle of the propeller in order to increase the rotational speed of the propeller towards the reference speed, and determining, from the at least one sensor signal, whether the expected change in the blade angle of the propeller has occurred in response to the command comprising determining whether the blade angle of the propeller has decreased in response to the command; and outputting the command comprising instructions for adjusting the blade angle of the propeller in order to decrease the rotational speed of the propeller towards the reference speed, and determining, from the at least one sensor signal, whether the expected change in the blade angle of the propeller has occurred in response to the command comprising determining whether the blade angle of the propeller has increased in response to the command.

16. The system of claim 13, wherein the program code is executable by the processing unit for determining, on either of a first controller channel and a second controller channel, that the rotational speed of the propeller is within the predetermined range of the reference speed and that the expected change in the blade angle of the propeller has failed to occur.

17. The system of claim 14, wherein the program code is executable by the processing unit for outputting a subsequent command in response to determining that movement of the feedback device along the axis is inoperable, the subsequent command comprising instructions for one of:

causing the propeller to feather;

causing the propeller to feather and bringing a power of the engine to idle; and causing the governing current to be limited in order to restrict a volume of the fluid exchanged between the blade angle actuator and the source of the fluid and prevent the blade angle from being adjusted towards a reverse range.

18. The system of claim 13, wherein the feedback device is coupled to the propeller for rotation therewith about the axis and moves along the axis with adjustment of the blade angle of the propeller, the determining that movement of the one of the feedback device and the at least one sensor along the axis is inoperable comprising determining that movement of the feedback device along the axis is inoperable.

* * * * *